(12) United States Patent
Moore et al.

(10) Patent No.: US 7,746,834 B1
(45) Date of Patent: Jun. 29, 2010

(54) METHOD OF DYNAMICALLY LOCATING AND CONNECTING TO A WIRELESS DEVICE

(75) Inventors: David Moore, Riverton, UT (US); Thomas Scribner, Sandy, UT (US)

(73) Assignee: 3Com Corporation, Marlborough, MA (US)

( * ) Notice: Subject to any disclaimer, the term of this patent is extended or adjusted under 35 U.S.C. 154(b) by 1438 days.

(21) Appl. No.: 10/390,052

(22) Filed: Mar. 17, 2003

(51) Int. Cl.
*H04Q 7/24* (2006.01)
(52) U.S. Cl. .................. 370/338; 370/522; 455/423
(58) Field of Classification Search ......... 370/328–329, 370/331, 338, 401, 468, 522; 455/99, 345, 455/422.1, 423
See application file for complete search history.

(56) References Cited

U.S. PATENT DOCUMENTS

| | | | | |
|---|---|---|---|---|
| 6,842,460 | B1 * | 1/2005 | Olkkonen et al. | 370/465 |
| 6,901,057 | B2 * | 5/2005 | Rune et al. | 370/310 |
| 7,113,796 | B2 * | 9/2006 | Zhang et al. | 370/389 |
| 7,146,636 | B2 * | 12/2006 | Crosbie | 710/37 |
| 7,164,663 | B2 * | 1/2007 | Frank et al. | 370/328 |
| 7,164,885 | B2 * | 1/2007 | Jonsson et al. | 455/41.2 |
| 7,302,256 | B1 * | 11/2007 | O'Hara et al. | 370/329 |
| 2001/0033554 | A1 * | 10/2001 | Ayyagari et al. | 370/401 |
| 2002/0120750 | A1 * | 8/2002 | Nidd | 709/227 |
| 2002/0128000 | A1 * | 9/2002 | do Nascimento, Jr. | 455/414 |
| 2002/0146999 | A1 * | 10/2002 | Witte | 455/345 |
| 2003/0095524 | A1 * | 5/2003 | Stephens et al. | 370/338 |
| 2004/0009769 | A1 * | 1/2004 | Yokoyama | 455/423 |
| 2004/0202132 | A1 * | 10/2004 | Heinonen et al. | 370/331 |
| 2004/0221046 | A1 * | 11/2004 | Heinonen et al. | 370/329 |
| 2005/0192048 | A1 * | 9/2005 | Bridgelall | 455/553.1 |
| 2006/0189359 | A1 * | 8/2006 | Kammer et al. | 455/574 |

* cited by examiner

*Primary Examiner*—Ricky Ngo
*Assistant Examiner*—Phuongchau B Nguyen (57) ABSTRACT

A method for wirelessly connecting a computer network to a destination device located at an unknown location in response to a request from a requesting device. The method of the present invention creates a more versatile wireless computer network by enabling devices within the computer network to efficiently wirelessly connect to mobile devices that are not connected to the computer network but are in range of at least one wireless access point. Therefore, the network can efficiently dynamically adjust to the movement of particular wireless devices throughout the network. Likewise, the method effectively increases the capabilities of the network by enabling devices within the network to efficiently connect with devices that are not actively communicating with the network. The method includes a series of searching routines which are performed at each access point to locate the destination device.

5 Claims, 6 Drawing Sheets

METHOD OF DYNAMICALLY LOCATING AND CONNECTING TO A WIRELESS DEVICE

BACKGROUND OF THE INVENTION

1. The Field of the Invention

This invention relates generally to the field of wireless communication software. In particular, embodiments of the present invention relate to a method for locating and connecting to a wireless device within a wireless network.

2. The Relevant Technology

Short range wireless communication schemes are increasingly used as an alternative to wire-based networks to interconnect computers and computer devices. The use of wireless communications provides a number of advantages, including the elimination of complex, expensive, and inconvenient wire-based connection schemes. While a number of wireless communications standards have been developed for such applications, one popular example is known as "Bluetooth." The Bluetooth standard uses low power radio frequencies to allow communication between various devices such as mobile phones, laptop and desktop computers, printers, modems, PDAs, etc. This technology was originally envisioned for the purpose of replacing cabling and other hard-wired connection schemes used to connect auxiliary devices to a desktop or laptop computer. However, Bluetooth has further evolved into a method of sending both data and voice signals between a wide range of devices. For example, a Bluetooth-enabled PDA can be configured to automatically connect to a Bluetooth-enabled communications line within a building, therefore gaining wireless access to computing resources, such as printers, an Internet portal, etc.

In an effort to ensure compatibility among Bluetooth implementations, a Bluetooth special interest group (SIG) was formed. One of the main objectives of the Bluetooth SIG is to formulate a standardized specification for every element of Bluetooth. The specification dictates numerous software and hardware characteristics so that devices made by different manufacturers will be compatible with one another. The specification dictates all aspects of Bluetooth technology from the software stack necessary to run Bluetooth devices to the actual hardware requirements.

As per this standard, Bluetooth compatible technology is composed of multiple components that together provide for wireless communication capabilities. For example, each Bluetooth-compatible device is configured with a radio that can transmit and receive wireless signals on a particular frequency band. In addition, there are certain structural elements required for connecting the radio to the specific host device. Further, each Bluetooth-compatible device is also configured with particular software to allow the device to properly process and route data or voice signals. This software is typically referred to as the "protocol stack" because it is composed of numerous components that are each configured to perform a particular function. Information is generally passed between the respective layers of the stack either from the bottom of the stack to the top or vice versa, depending on the direction of the communication involved. The protocol stack is further broken up into a "transport protocol group," a "middleware protocol group" and an "application protocol group".

In general, the transport protocol group includes functional components that are designed to allow Bluetooth devices to locate one another within a Bluetooth network, and to manage the links that allow higher layer protocols and applications to pass data through the transport protocols. The transport protocol group is comprised of a radio, a baseband controller, a link manager, a logical link control and adaptation protocol (L2CAP), and a host controller interface (HCI). The baseband controller defines how devices search for one another and how they connect to one another via a Bluetooth Device Discovery and Connection process. The baseband controller also defines the master and slave roles between devices. The link manager supervises the creation of pairing between devices and the encryption of data. The link manager also supervises power control among devices. For example, the link manager can initiate a low power adjustment between devices to conserve energy. The L2CAP supports the protocol multiplexing that allows multiple protocols to utilize the same air-interface. It also maintains the desired level of service among devices. The HCI allows higher layers of the stack to access the baseband controller and link manager. The HCI is not a required part of the Bluetooth specification. The radio, link manager and baseband controller are sometimes grouped together to form what is referred to as a Bluetooth module. The remaining components of the transport layer are typically located on the actual Bluetooth host device.

The middleware protocol group is directed to functionality that facilitates communication between host applications and the Bluetooth module. The protocols can include both third-party protocols and industry standard protocols specified by the Bluetooth SIG. The middleware protocol group specifically includes a RFCOMM, a service discovery protocol (SDP), a set of IrDa interoperability protocols, and a telephony control protocol (TCS). The RFCOMM protocol creates virtual serial ports to facilitate the replacement of cables with a wireless Bluetooth interface. The SDP protocol defines a standard method for Bluetooth devices to discover and learn about the services offered by other Bluetooth devices within the network. The SDP protocol is often utilized by other protocols for the purpose of identifying what services are available over a wireless air interface. The set of IrDa interoperability protocols helps to define the syntax of the data to be exchanged between devices. The TCS protocol is designed to control the exchange of voice communications between devices.

The application protocol group consists of the various applications that utilize Bluetooth communications. The applications may be unaware that data is being transmitted over a Bluetooth air-interface rather than a standard cable, or the application may be specifically designed to interact with Bluetooth devices.

Bluetooth devices from what are known as "piconets" with one another. A piconet is comprised of one Bluetooth device acting as a master and numerous other devices acting as slaves. Both the master and the slave devices can transmit and receive data from one another. However, the master device defines the data hopping sequence and is usually the device that initiates the communication. Initiation of a communication depends, in part, on the configuration state of a device. For example, an "active state" is a system configuration in which the slave device is always listening for transmissions from the master. In a "parked state" the slave device is only periodically listening to the master. Thus, a parked slave must become active before it can communicate normally with the master. In addition, there is a sniff state and a hold state, both of which are considered active states. The sniff and hold states are used as alternatives to the full active state for the purpose of conserving power. A slave device in a sniff mode essentially communicates with the master at regular intervals rather than always listening. A slave device in a hold mode essentially stops listening to the master for a specified period of time.

There are several limitations present in the Bluetooth standard that can degrade the overall operating efficiency of a Bluetooth network. A primary limitation relates to the number of active slave devices that can be connected within a single piconet. Up to seven active slave devices and up to 255 parked slave devices can be linked to a master device in a single piconet at a given time. The seven device limitation prevents the master from actively communicating with more than seven slave devices at any given time. This device limitations is mandated by the physical bandwith characteristics of Bluetooth devices. Obviously, the seven device limitations can limit the functionality that is available to a master device at any given time, which may in turn severely limit the operating efficiency of the Bluetooth network. For example, if an application needs to establish a communication link with the Internet, it may request a Bluetooth-connection with a Bluetooth enabled modem. However, if the modem is attached to one of the parked Bluetooth slave devices (i.e., not available as one of the seven active devices), it may take a relatively long amount of time before the parked device becomes active and actually processes the request from the application. This time delay is obviously undesirable.

In addition, one Bluetooth device may be part of multiple piconets. For example, the master of one piconet may also be a slave in another piconet. In this scenario, a slave device from one piconet could order a "print" command. That print command could be routed through the master to a slave which happens to be a master of another piconet that contains a printer. That second master will then send the signal to the printer. However, this type of situation could severely limit the bandwidth of the second master as it is routing the print command (and associated print data) to the printer, thereby limiting its ability to respond to other requests within its piconet. Again, this problem is in large part a result of the seven device limitation.

In addition to communicating with other devices, each individual Bluetooth device periodically executes a search routine (SDP protocol) to locate new devices within the area. This is necessary for automatically connecting to new devices as they become available. In particular, the master periodically searches for new devices in addition to communicating with all of the slaves in the particular piconet. Although it is very useful for the master of each piconet to periodically find new stationary devices as they become available, it is not always possible to connect with these devices in a timely manner. For example, a requesting device connected to the computer network may desire a connection with another device that is known but not connected to the network. An automatic SDP search routine that is executed every ten minutes may find the device but it would most likely introduce a long delay. Alternatively, it would be possible to increase the automatic SDP search routine but this would introduce delay in all of the other transmissions to and from the master.

Therefore, a method for efficiently connecting with a specific wireless device at an unknown location within a wireless computer network is needed. In addition, the method should be cost effective to implement in a wireless networking environment. The method should require less processing power and bandwidth than the standard SDP search routine.

BRIEF SUMMARY OF EMBODIMENTS OF THE INVENTION

These and other problems in the prior art are addressed by embodiments of the present invention, which relates to a method for wirelessly connecting a computer network to a destination device located at an unknown location. The method of the present invention creates a more versatile wireless computer network by enabling devices within the computer network to wirelessly connect to mobile devices that are not connected to the computer network but are in range of at least one wireless access point.

In one presently preferred Bluetooth embodiment from the computer network perspective, the method begins by receiving a request to connect to a particular destination device from a requesting device that is connected to the computer network. The method then determines whether the destination device is connected or associated with the network in any way. If the destination device is already connected to the network, the method establishes a connection between the requesting device and the destination device. However, if the destination device is not connected to the network, the method will transmit a search request for the destination device over all of the wireless access points within the computer network. If one of the wireless access points receives a search response from the destination device, a connection will be established. If no search response is received within a certain period of time, the method will transmit a connection request for the destination device over all of the wireless access points within the computer network. In either case, if a connection between the computer network and the destination device is successfully established, the lookup tables for the wireless access point connecting the device to the computer network will be updated to reflect the active connection with the destination device. If a connection between the computer network and the device is not established, the method will repeat the process for a specified number of iterations. If the specified number of iterations are completed and a connection between the computer network and the destination device is not established, the method will inform the client that the destination device is unavailable.

In one presently preferred Bluetooth embodiment from the destination device perspective, the method begins by receiving a search request containing a device identifier. If the device identifier is different from the destination device's own identifier, the method will ignore the search request. If the device identifier matches the destination device's own identifier, the method will prompt the user as to whether he/she wishes to connect to the computer network. If the user responds negatively, the method will ignore the search request. If the user responds positively, the method will transmit a search response to the wireless access point. The method will then establish a connection between the destination device and the computer network.

The method described above could be used to create an efficient dynamic network that opens and closes connections depending on their necessity. One application for this type of network would be a network telephone/communication system. If all of the users within a particular group each possess a portable computer device with wireless capabilities such as a PDA with a Bluetooth card, the method could be used to create a telephone system. If one user wants to speak with another, he/she simply types in an identifier and the method of the present invention establishes a connection with the desired party whether or not he/she is currently connected to the network.

Thus, the present invention provides a number of benefits and advantages over the prior art by enabling a computer network to connect with a destination device in response to a request from a requesting device. By enabling a dynamic form of connecting, the capabilities of a wireless network can be increased. For example, in a Bluetooth environment, a single device executes a wireless search routine at specified intervals that may or may not coincide with a communication request. Whereas, the traditional search routine performed by a Bluetooth device is slow and cumbersome in some respects because it is looking for any new devices that are within range rather than focusing on locating devices that have been requested. In addition, the method of the present invention performs a dynamic narrow search for a particular destination device that is requested by a requesting device.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be given by making reference to a specific embodiment that is illustrated in the appended drawings. These drawings depict only one embodiment of the invention and are not to be considered limiting of its scope.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to a method for wirelessly connecting a computer network to a destination device located at an unknown location. The method of the present invention creates a more versatile wireless computer network by enabling devices within the computer network to wirelessly connect to mobile devices that are not connected to the computer network but are in range of at least one wireless access point. The method provides a user friendly interface that allows a requesting device to efficiently identify a particular destination device that is to be located and connected to. Also, while embodiments of the present invention are described generally in the context of Bluetooth wireless computer networks, it will be appreciated that the teachings of the present invention are applicable to other applications as well. For example, the teachings of the present invention could be used to establish connections with devices in any form of wireless network.

Figure 1:
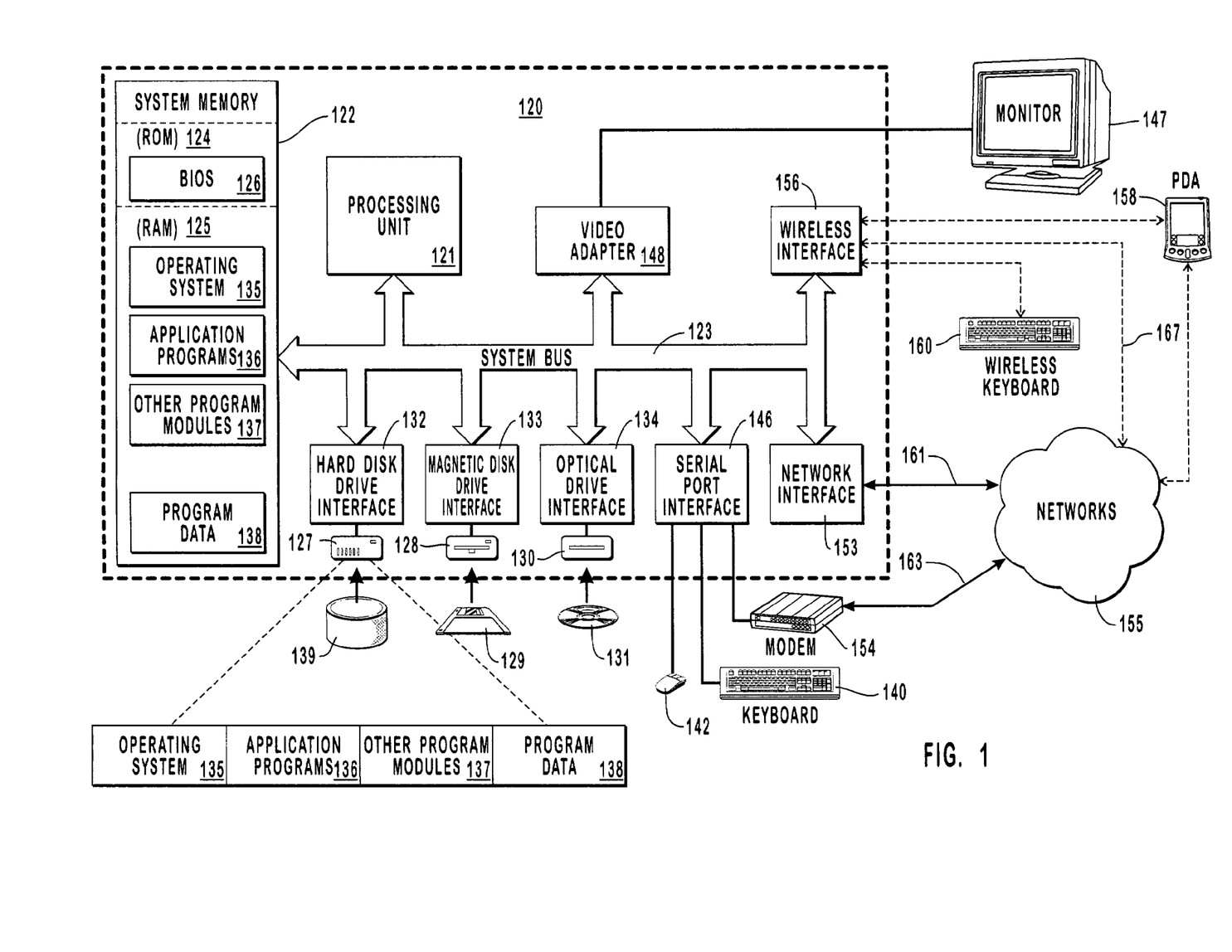
FIG. 1 illustrates an example computer processing system that provides a suitable operating environment for the present invention.

FIG. 1 and the following discussion are intended to provide a brief, general description of an example of a suitable computing environment in which embodiments of the present invention may be implemented. Although not required, embodiments of the invention may be described in the general context of computer-executable instructions, such as program modules, being executed by computers operating within network environments. Generally, the term "program modules" is intended to include, without limitation, routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing embodiments of the invention includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to other remote computers, which may be personal computers, servers, routers, network PCs, peer devices or other common network nodes, and typically include many or all of the elements described above relative to the computer 120. Examples of various logical connections to network 155 are depicted in FIG. 1 include a wireless network 167, a wired local area network (LAN) 161, and a wide area network (WAN) 163. Each of the logical connections 167, 161, 163 represent a different way for the computer 120 to connect to the network 155. The wireless network 167 may utilize radio frequencies, microwaves, infrared light, etc. to transmit signals via the wireless interface 156 to the network 155. The wire-based LAN 161 utilizes, for example, an Ethernet, a USB network, or a token ring network to transmit signals from the network interface 153 to the network 155. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of example, the wireless interface 156 could be implemented as a short range radio transceiver that preferably utilizes low power radio frequencies to transmit information over relatively short distances. For example, the wireless interface could be implemented as a Bluetooth or an IEEE 802.11 transceiver module, or any other equivalent type of wireless transceiver that is capable of wireless communication. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module. In addition, the wireless interface 156 can connect to devices that typically use other interfaces when communicating with the computer 120. For example, keyboards are typically connected to the computer 120 via the serial port interface 146, but may also be connected with a Bluetooth module. To do so, the wireless interface 156 typically includes a protocol that is capable of emulating a standard interface communication sequence, such as a serial port. For example, in a Bluetooth system, the RFCOMM protocol can be used to create virtual serial ports so that serial devices can be wirelessly connected to the computer 120 via the wireless interface 156 without extensive manipulation of existing software drivers, application software, etc.

For purposes of illustration, wireless transceiver module 156 in FIG. 1 is implemented as a Bluetooth compatible wireless transceiver or radio. As previously discussed, a Bluetooth transceiver device 156 is configured with a radio that can transmit and receive signals on a particular frequency band. In addition, the device is typically programmable, and is configured with software to process and route wireless signals. This software is implemented as a protocol stack, which is comprised of functional components that are organized within adjacent layers to form a logical stack. Also, depending on the implementation scheme, certain of the components of the stack reside within the host device (such as computer 120) memory and are executed by the host processor (121 in FIG. 1), and other components of the stack are stored and executed at the Bluetooth module itself (e.g., 156 in FIG. 1).

Figure 2:
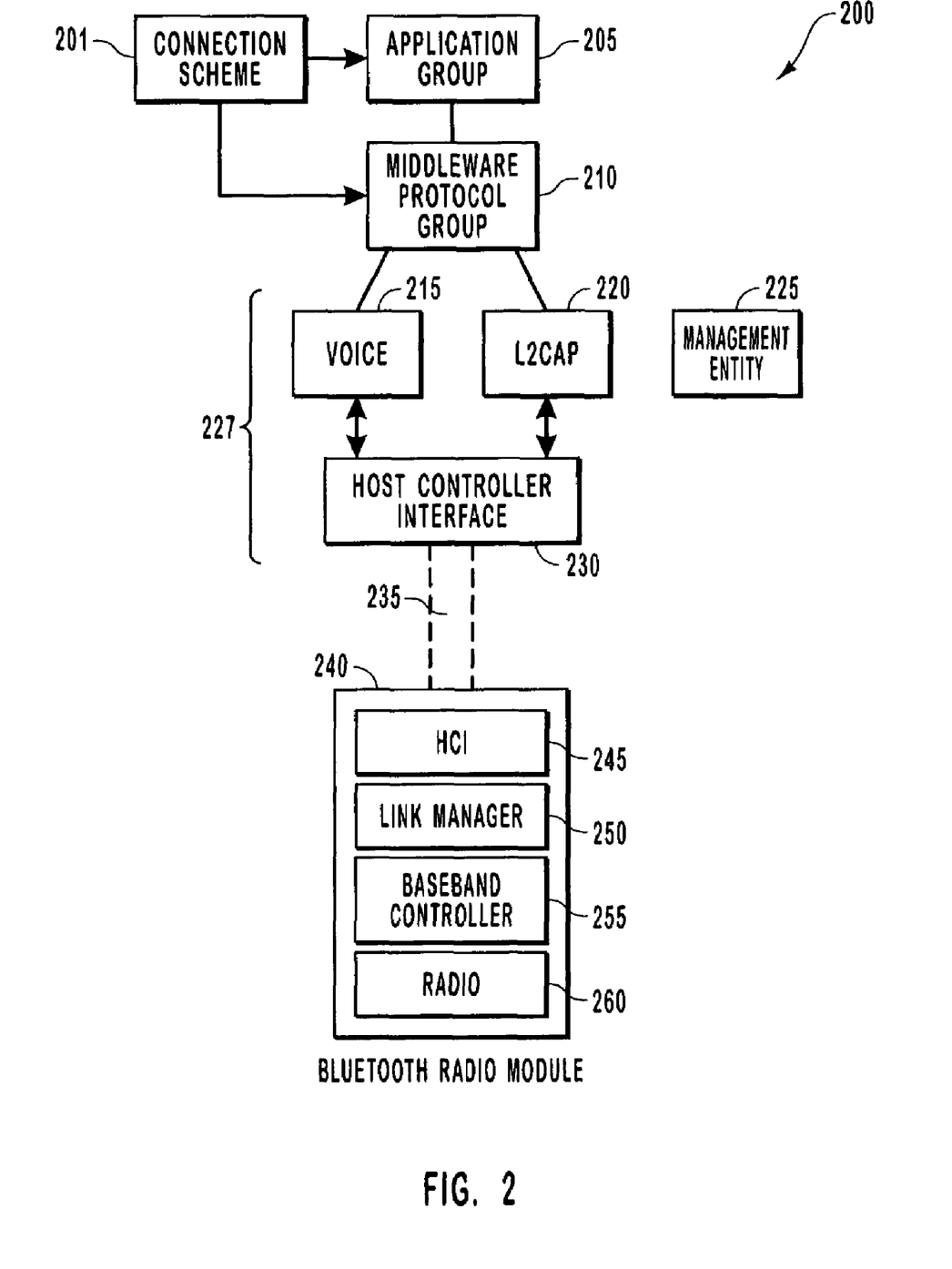
FIG. 2 illustrates a functional block diagram of a standard Bluetooth protocol stack located on the wireless interface of FIG. 1, wherein the Bluetooth protocol stack could implement the present invention to connect a computer network with a destination device (the destination device) located at an unknown location.

Reference is next made to FIG. 2 which illustrates a functional block diagram of a standard Bluetooth protocol stack located on the wireless interface of FIG. 1, designated generally at 200, that is implemented in accordance with the teachings of the present invention. A protocol stack is a chart representing the various stages a command goes through to perform a particular task. For example, a text editor application may initiate a print command which then travels down through each layer of the protocol stack and across a Bluetooth wireless interface to a printer which prints the document. In the illustrated embodiment, the protocol stack 200 is comprised of multiple sub-elements which are vertically positioned to indicate a sequence of communication. Typically, information is passed either from the bottom to the top or vice versa. The uppermost element of the protocol stack 200 is the Application Group 210. The Application Group 210 represents the higher level applications that directly interact with the user. An application within the Application Group 210 will often send commands to devices that may be connected via a Bluetooth module such as a printer, a modem, a fax, etc. The next element down in the protocol stack 200 is the Middleware Protocol Group 215. The Middleware Protocol Group 215 represents the various protocols that are used as channels between the upper Application Group 210 and the lower levels of the protocol stack 200. These protocols include TCP, TCS-BIN, PPP, etc. The applications in the Application Group 210 may use one or more of the protocols in the Middleware Protocol Group 215 to communicate with the lower levels 227 of the protocol stack 200. The remainder of the functional block diagram shown in FIG. 2 represents the lower levels 227 of the protocol stack 200.

In the illustrated embodiment, a Bluetooth Connection Scheme, or simply "Connection Scheme" designated at 201, is functionally interfaced with the protocol stack 200. This Connection Scheme 201 is a software module executing on the host device that provides a user with the ability to wirelessly connect with a known device that is located at an unknown location. As will be described in further detail below in connection with FIGS. 3-6, the Connection Scheme 201 operably interfaces with certain functional components of the protocol stack so as to efficiently connect a requesting device with a destination device, rather than waiting for the next standard search sequence. In general, the connection scheme is a series of steps that are performed by various devices that are involved in establishing a connection between a requesting device and a destination device.

With continued reference to FIG. 2, a Host Controller Interface (HCI) 230 is located within the lower level 227 of the protocol stack 200 and another HCI is located within the Bluetooth module 240. A connection scheme 232 interfaces with the upper HCI 230 to provide a method for wirelessly connecting a computer network and a destination device located at an unknown location. The HCIs 230 245 create a standardized interface between the lower level 227 of the protocol stack 200 and the Bluetooth module 240. The standard interface is designed to allow for compatibility among Bluetooth module manufacturers. The connector 235 connects the Bluetooth module 240 to the lower level 227 of the protocol stack 200. The connector 235 is preferably a standard connector such as USB, serial, parallel, PC board, etc. The Bluetooth module 240 further comprises a HCI 245, a Link Manager 250, a Baseband Controller 255 and a Radio 260. The Link Manager 250 manages the properties of the air interface between the Bluetooth devices. The Baseband controller 255 manages how the Bluetooth devices talk to one another. And the radio 260 transmits and receives the low power radio signals or wireless data packets across the air interface between Bluetooth devices.

As is further shown in FIG. 2, data packets are routed to either a Voice 215 element or a L2CAP 220 element depending on whether the information contains voice signals or data signals. Voice signals are sent through the Voice 215 element and data signals are sent through the L2CAP 220 element. In addition, the L2CAP element 220 is involved in further routing data signals to and from protocols in the middleware protocol group 210. The Management Entity 225 manages how the other elements perform their functions. Information is never directly sent through the Management Entity 225 but it is involved in establishing connections between devices and then managing the flow of information through each element.

Figure 3:
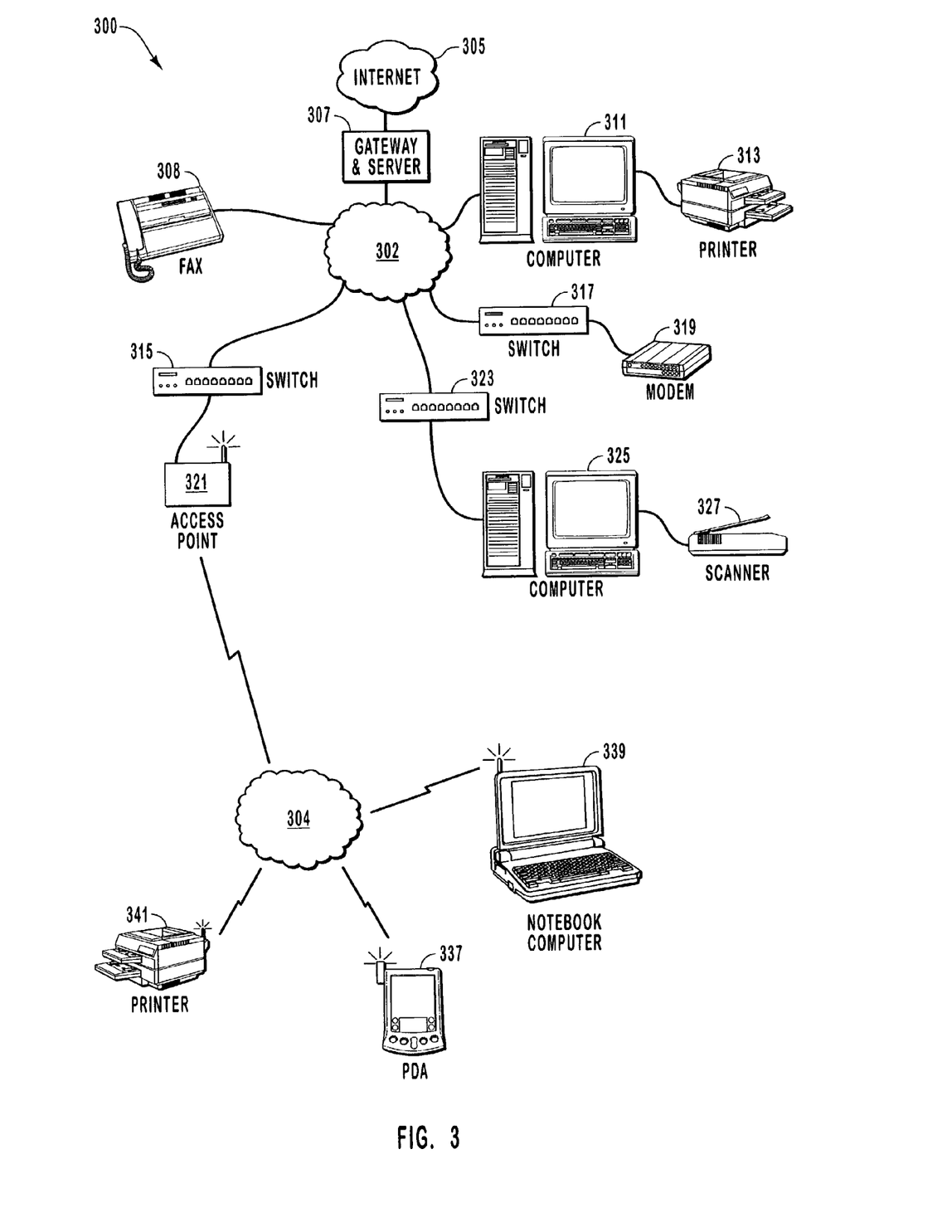
FIG. 3 illustrates an example network environment in which the present invention could be used to connect the computer network to a destination device located at an unknown location.

Reference is next made to FIG. 3, which illustrates one example of a network environment, designated generally at 300, in which an embodiment of the invention could be implemented and used to locate, and then connect to, a Bluetooth-enabled wireless device. In this particular example, the network environment is composed of a wire-based network, designated at 302, and a wireless-based network designated at 304. The wire-based portion of the network 302 includes a gateway and server 307, which provides a connection to the Internet 305. Access to the wire-based network is provided to wireless devices via a wireless access point, which is designated at 321.

As is shown in the illustrated example, in network 302, network devices can be connected to the network via the servers, via other computing devices (such as switches 315, 323), via the wireless access point 321, or they can be connected directly to the network via an appropriate network interface. For example, Fax machine 308 is directly connected to the network 302. As is well known, a direct connection to the network medium (whether it be wire-based or wireless) requires the device to have some form of network interface, such as a network interface card (NIC) 153 (FIG. 1). Alternatively, devices can be connected to a switch or a computer that possesses the necessary network interface device for connecting to the network. For example, printer 313 is connected to computer 311 which is in turn connected to network 302.

Certain wireless standards such as Bluetooth allow for "ad hoc" networking wherein wireless devices can communicate directly with one another. For example, PDA 337 or notebook computer 339 could communicate directly with printer 341 in order to print a document. Ad hoc networks enable users of wireless devices to spontaneously communicate with one another even when a formal network is not established. Alternatively, devices can access resources on the wire-based network 302 via a wireless access point, such as that designated at 321. For example, PDA 337 could print a document on printer 313 located on the wire-based network 302 via access point 321. In a Bluetooth or 802.11 embodiment, a wireless device that wishes to utilizes the resources of a wire-based network would transmit wireless data directly to an access point which then converts the wireless data into wire-based data which is transmitted into a wire based network. The logical representation of a wireless-based network 304 in FIG. 3 includes but is not limited to both of the wireless architectures described above.

As is also shown in FIG. 3, the presently preferred embodiment of a method for wirelessly connecting a computer network to a destination device located at an unknown location, could be implemented in the computer network 300. A destination device is defined as a wireless device that is identified and requested by a requesting device. A wireless device can be any wireless enabled device including but not limited to a portable computer device, a personal digital assistant (PDA), a laptop, a desktop, a printer, a modem, or an audio speaker. A requesting device is defined as a device within a computer network that has the capability of identifying a particular device with which it wishes to connect. For example, computer 311 initially requests a connection with PDA 337 by inputting a device identifier corresponding to the PDA 337. The method will then determine whether the PDA 337 is connected to the network. If the PDA 337 is connected to the network, a connection will be established between computer 311 and PDA 337. If the PDA 337 is not already connected to the computer network 300, the method will transmit a search request for PDA 337 across the wireless access point 321. If the wireless access point 321 receives a search response from the PDA 337, a connection will be established. If no search response is received within a certain period of time, the method will transmit a connection request for the PDA 337 across the wireless access point 321. A connection request is a data signal that allows a wireless device to automatically establish a connection by simply responding to the connection request. Some Bluetooth devices are configured not to respond to search requests for security reasons. In either case, if a connection between the computer network 300 and the PDA 337 is successfully established, the lookup tables for the wireless access point connecting the device to the computer network 300 will be updated to reflect the active connection with the PDA 337. If a connection between the computer network 300 and the PDA 337 is not established, the method will repeat the process for a specified number of iterations. If the specified number of iterations are completed and a connection between the computer network 300 and the PDA 337 is not established, the method will inform computer 311 that the PDA 337 is unavailable. Other steps could be added to the method to efficiently connect to a device that is moving between subnets. For example, if the PDA 337 continually moved between subnet 2 304 and subnet 1 302, it would be difficult for either access point 321 335 to establish a reliable connection with the PDA 337. Various steps may be added to the method to increase the connection reliability in such a situation. The methodology by which the method wirelessly connects a computer network with a destination device at an unknown location, will be described in more detail with reference to FIGS. 4, 5 and 6.

Figure 4:
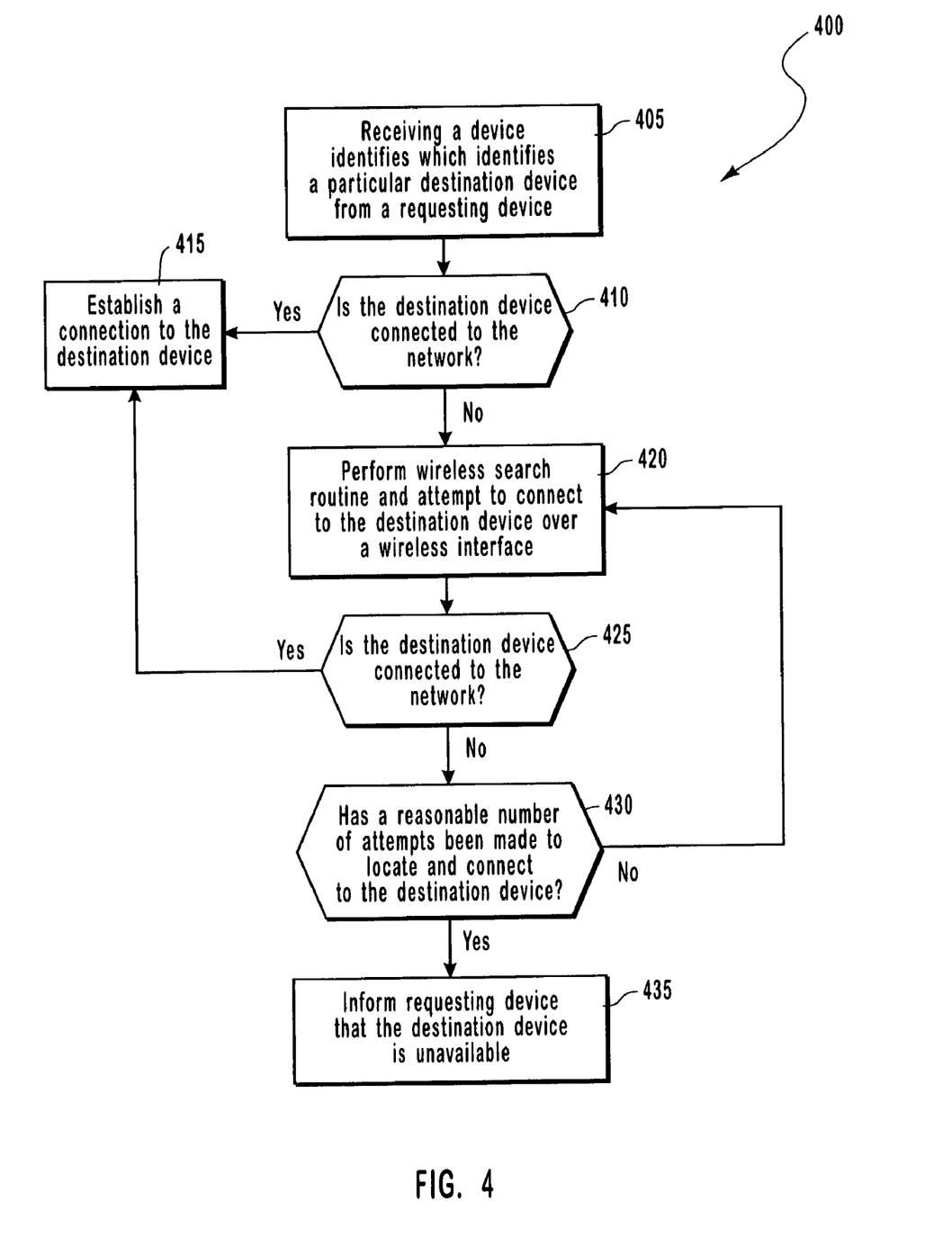
FIG. 4 illustrates a logical flow chart of one presently preferred embodiment, from a computer network perspective, of the method for connecting a computer network with a destination device located at an unknown location.

Reference is next made to FIG. 4 which illustrates a logical flow chart of one presently preferred embodiment, from a computer network perspective, of the method for connecting a computer network with a destination device located at an unknown location, designated generally at 400. First, the computer network receives a device identifier which identifies a particular destination device 405 from a requesting device connected to the computer network. The requesting device is preferably a computer device such as a cell phone, a PDA, a computer, a laptop, etc. The computer network then determines whether the destination device is presently connected to the computer network 410. If the destination device is connected to the computer network, a connection between the requesting device and the destination device is established 415. If the destination device is not connected to the computer network, the computer network performs a search and connect routine 420. One presently preferred embodiment of this search and connect routine is described with reference to FIG. 5. The computer network then determines whether the destination device is now connected to the network after the search and connect routine is performed 425. If the destination device is connected to the computer network, a connection between the requesting device and the destination device is established 415. If the destination device is still not connected to the computer network, the computer network determines whether a reasonable number of attempts have been made to connect to the destination device 430. A reasonable number of attempts is a user defined variable which depends on the characteristics of the computer network within which the method is implemented. For example, if there is a significant amount of noise or cross-talk within the physical area of the computer network, it would be useful to have a larger number of reasonable attempts. A large number of reasonable attempts may also be helpful in connecting with a mobile device that is moving between subnets. Whereas, if the computer network is located in a relatively clean area, a reasonable number of attempts may be very low. If a reasonable number of attempts have not been made, the computer network will return to the search and connect routine 420. If a reasonable number of attempts have been made, the computer network will inform the requesting device that the destination device is not available within the network 435. It should be noted that the above referenced steps may be performed by any form of software, hardware of firmware modules located on the computer network.

Figure 5:
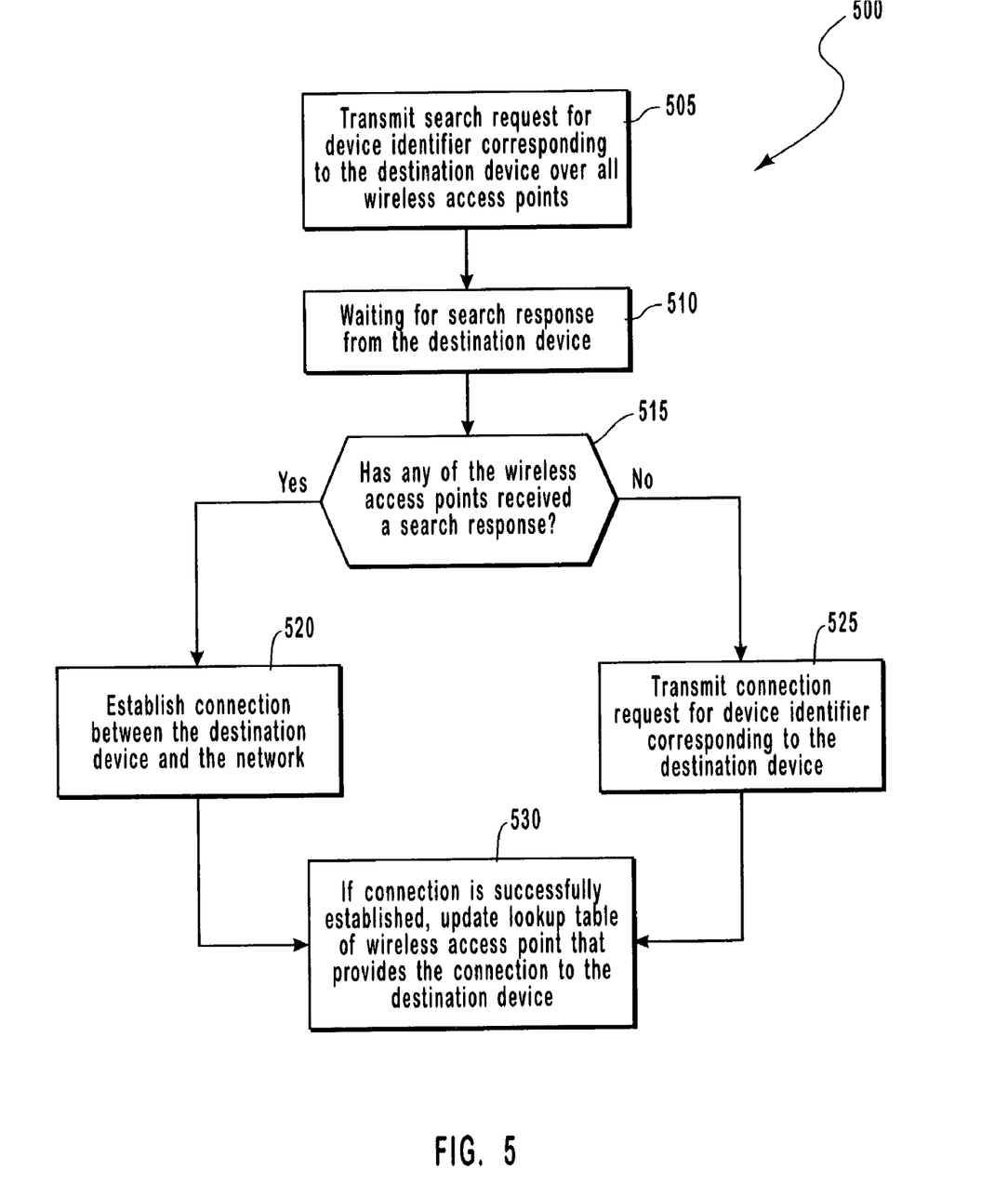
FIG. 5 illustrates a logical flow chart of one presently preferred embodiment of element 420 from FIG. 4, which performs a wireless search over the computer network and attempts to connect with the destination device.

Reference is next made to FIG. 5 which illustrates a logical flow chart of one presently preferred embodiment of a method for wirelessly searching over the computer network and attempting to connect with the destination device, represented as element 420 in FIG. 4, and designated generally at 500 in FIG. 5. Each wireless specification has a specific type of search and connection process by which devices are wirelessly connected to a computer network. The present steps may be modified to accommodate new technologies that require different search and connection steps. First, the computer network transmits a search request corresponding to the destination device (see FIG. 4) over all of the wireless access points within the computer network 505. The wireless access points may be configured to transmit this search request in multiple frequencies or data formats to accommodate various wireless technologies. The computer network then waits a predetermined time for a search response from the destination device 510. The predetermined time depends on the wireless specification and the individual characteristics of the wireless network. The computer network then determines whether any of the wireless access points have received a search response from the destination device 515. If at least one of the wireless access points receive a search response from the destination device, the computer network will establish a connection between the destination device and the requesting computer (see FIG. 4) 520. Whereas, If none of the wireless access points receive a search response from the destination device, the computer network will transmit a connection request for the device identifier corresponding to the destination device 525. Sometimes, devices cannot be found with a search response but they can be directly connected to. This is a security feature found on some Bluetooth wireless computer networks. In either case, the computer network will determine if a connection between the requesting device and the destination device was successfully established; if so, the computer network will update the lookup table of the wireless access point providing the connection to the destination device 530. Other steps may be added to this process to accommodate different wireless technologies and security/privacy features that may be implemented on existing wireless devices. It should be noted that the above referenced steps may be performed by any form of software, hardware of firmware modules located on the computer network.

Figure 6:
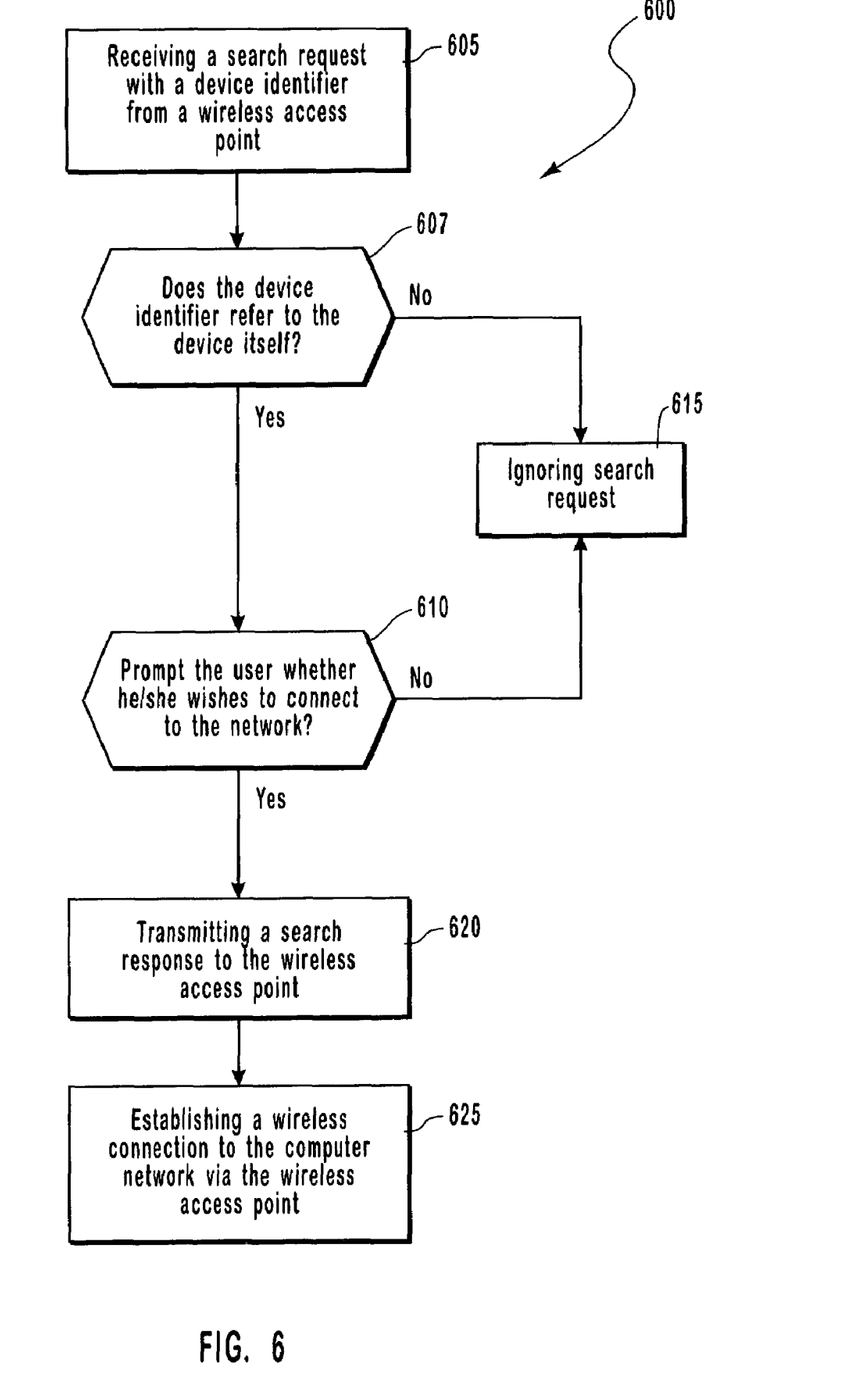
FIG. 6 illustrates a logical flow chart of one presently preferred embodiment, from a device perspective, of the method for connecting a destination device to a computer network.

Reference is next made to FIG. 6 which illustrates a logical flow chart of one presently preferred embodiment, from a destination device perspective, of the method for connecting a destination device to a computer network, designated generally at 600. This chart illustrates the process which the destination device or device follows in being automatically connected to a computer network by the method described in FIGS. 4 and 5. The device is equipped with a wireless interface device such as a Bluetooth or an IEEE 802.11 card that allows it to receive and transmit wireless data signals. First, the device receives a search request containing a device identifier from a wireless access point 605. Most wireless devices periodically listen for incoming data signals and will eventually hear the search request if they are within range. The device then receives or hears this search request via the transceiver located in the wireless interface device. The device then determines whether the device identifier refers to the device itself 607. If the device identifier does not refer to the device itself, the device ignores the search request 615. But, if the device identifier does refer to the device itself, the device prompts the user whether he/she wishes to be connected to the network 610. If the user inputs a negative response, the device ignores the search request 615 and the process terminates. Whereas, if the user inputs a positive response, the device transmits a search response to the wireless access point 620. The device then establishes a wireless connection between the device and computer network via a wireless access point 625. Additional steps may be added or subtracted to accommodate different wireless technologies. For example, in a Bluetooth system it would be necessary to receive a connection request and then transmit a connection response to completely establish the connection between the computer network and the device. It should be noted that the above referenced steps may be performed by any form of software, hardware of firmware modules located on the device.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network having at least one Bluetooth compatible wireless access point, a method for connecting to a Bluetooth compatible destination device located at an unknown location to the computer network, the method comprising the acts of:

transmitting a wireless discovery request, said request originating from a device connected to the network by a wired connection and including a device identifier for the Bluetooth compatible destination device, throughout the computer network to determine whether the Bluetooth compatible destination device is already connected to the computer network, wherein if the Bluetooth compatible destination device does not respond to the wireless discovery request within a certain period of time, the transmitting further comprises:

transmitting, if no response to the wireless discovery request is received from the Bluetooth compatible destination device, a Bluetooth direct connection request containing the device identifier over the at least one Bluetooth compatible wireless access points within the computer network for a specified number of iterations; and     automatically establishing by the Bluetooth compatible destination device, in response to the Bluetooth direct connection request, a connection between the Bluetooth compatible destination device and the computer network.

2. The method of claim 1, wherein the computer network includes at least one IEEE 802.11 access point.

3. The method of claim 1, wherein the destination device is a portable computer device.

4. The method of claim 1, wherein the destination device is a personal digital assistant.

5. The method of claim 1, wherein the location is the specific subnet location.

\* \* \* \* \*